(12) United States Patent
McAden (10) Patent No.: US 7,307,514 B2
(45) Date of Patent: Dec. 11, 2007

(54) METHOD FOR REMOTELY DETERMINING AND MANAGING CONNECTION OF TRACTOR AND TRAILER

(75) Inventor: Mark McAden, Frisco, TX (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 11/136,304

(22) Filed: May 23, 2005

(65) Prior Publication Data

US 2006/0261935 A1 Nov. 23, 2006

(51) Int. Cl.
*G08B 21/00* (2006.01)

(52) U.S. Cl. .............. 340/431; 340/531; 340/933; 180/167; 307/10.1

(58) Field of Classification Search ............ 340/431, 340/479, 452, 531, 933, 944; 180/167, 168; 701/1, 2, 23, 29, 47, 70; 303/122.02, 122.05; 307/9.1, 10.1

See application file for complete search history.

(56) References Cited

U.S. PATENT DOCUMENTS

| | | | |
|---|---|---|---|
| 4,897,642 A | 1/1990 | DiLullo et al. | |
| 5,025,253 A | 6/1991 | DiLullo et al. | |
| 5,142,278 A | 8/1992 | Moallemi et al. | |
| 5,397,924 A | 3/1995 | Gee et al. | |
| 5,442,810 A | 8/1995 | Jenquin | |
| 5,488,352 A | 1/1996 | Jasper | |
| 5,677,667 A | 10/1997 | Lesesky et al. | |
| 5,693,985 A | 12/1997 | Gee et al. | |
| 5,739,592 A | 4/1998 | Rigsby et al. | |
| 5,854,517 A | 12/1998 | Hines | |
| 6,111,524 A | 8/2000 | Lesesky et al. | |
| 6,378,959 B2 | 4/2002 | Lesesky et al. | |
| 6,501,376 B2* | 12/2002 | Dieckmann et al. | 340/479 |
| 6,582,033 B2 | 6/2003 | Lesesky et al. | |
| 6,668,225 B2* | 12/2003 | Oh et al. | 701/70 |
| 6,687,609 B2 | 2/2004 | Hsiao et al. | |
| 6,744,352 B2 | 6/2004 | Lesesky et al. | |
| 6,799,814 B2 | 10/2004 | Lesesky et al. | |
| 6,970,772 B2* | 11/2005 | Radtke et al. | 701/1 |
| 7,015,800 B2 | 3/2006 | Lesesky et al. | |
| 7,040,435 B1* | 5/2006 | Lesesky et al. | 180/167 |
| 7,113,852 B2 | 9/2006 | Kapadia et al. | |
| 2006/0208873 A1 | 9/2006 | Lesesky et al. | |

* cited by examiner

*Primary Examiner*—Anh V. La
(74) *Attorney, Agent, or Firm*—Robert A. Koons, Jr.; Armando A. Flores; Drinker Biddle & Reath LLP (57) ABSTRACT

Truck tractors in a transportation fleet include a transponder that transmits a unique tractor identifier to a connected trailer using a Power Line Communication (PLC) bus device. The information transmitted typically includes a manufacturing unique ID for the tractor and an optional user defined ID. The user defined ID may include a fleet division code. The tractor ID and/or fleet ID codes determine how the trailer is hooked up. In particular, with detection of a connected state signal from the PLC bus, together with receipt of tractor identification code(s) from the tractor, the trailer tracking device can now communicate the coupling event information to a centralized location, such as via a cellular telephone connection.

14 Claims, 7 Drawing Sheets

METHOD FOR REMOTELY DETERMINING AND MANAGING CONNECTION OF TRACTOR AND TRAILER

BACKGROUND OF THE INVENTION

The present invention relates to data communications between a truck tractor and a cargo trailer, and more specifically to techniques for remotely determining and managing their connection.

Mobile asset management is a major concern in various transportation industries such as trucking, railroad and rental cars. In the trucking industry, an asset manager needs to keep track of the status and location of each tractor and cargo trailer in a fleet. The fleet asset manager should also know whether each trailer is in service (i.e., already in use being transported by a tractor) or out of service (i.e., not being transported by a tractor at the present time). The asset manager should have similar information with respect to whether each tractor in a fleet is hauling a trailer or not, and thus whether it is available for service. The fleet asset manager should also be able to monitor the progress of each tractor and trailer according to a predefined plan, for scheduling purposes.

One difficult aspect of asset management concerns the availability and status of cargo trailers. Although empty trailers are often numerous and widely available, they are nomadic, can be scattered across a wide territory, and it is often difficult to know their specific status with certainty. Automated trailer tracking systems, such as described in U.S. Pat. No. 6,529,529 assigned to Terion, Inc., the assignee of the present invention, greatly enhance capabilities for fleet management. These systems typically include various sensors and communication units located on the tractor and trailer. The sensors can be used to determine the status and location of a trailer, check for proper operating conditions, determine any misuse, and monitor the progress of each tractor and its associated coupled trailer for scheduling and security purposes.

Automated tracking systems have become quite popular, as they allow transportation carriers and shippers to better manage their assets. However, one aspect that is not well tracked is the connection of a trailer to a specific tractor or type of tractor.

In the typical scenario, it is the sole responsibility of the driver to identify and communicate tractor/trailer connect and disconnect events to fleet managers via the asset management system. Unfortunately, the human driver can make mistakes, in occasionally picking up the wrong trailer, or in communicating the trailer identification number incorrectly. Such methods also do not address scenarios when someone intent on compromising a trailer or its cargo simply commits an outright theft of a trailer.

In certain other electronic systems used on trucks, status information for a trailer may be communicated to a tractor. See for example, U.S. Pat. No. 6,799,814 which describes a system wherein an Anti-lock Braking System (ABS) produces a data signal. The ABS data signal is then sent to the tractor using a Power Line Carrier (PLC) type communication bus. In this manner, the status of a subsystem such as the status of the braking system may be displayed or may otherwise made available to the driver.

SUMMARY OF THE INVENTION

The present invention is a method for remotely determining and managing the connection of a tractor to a trailer. The invention uses a trailer tracking device which can determine the location of a trailer, such as via a Global Positioning System (GPS) receiver, and other status information. The trailer tracking device also has a wireless communication subsystem, such as a cellular radio telephone modem, which permits data to be exchanged between the trailer and a trailer asset management system located at a central location.

The trailer tracking device also includes a Power Line Carrier (PLC) communication device. The PLC device may, for example, use the seven-pin industry standard J560 cable as a bus, and communication protocols associated with the so-called PLC4TRUCKS protocol developed as the Society of Automotive Engineers (SAE) J1587 standard, to transmit data on the bus.

Each tractor in a transportation fleet of interest includes a transponder that transmits a unique tractor identifier to any connected trailer using the PLC device. The tractor ID transponder can transmit on a periodic schedule and/or upon receiving a query message from the trailer tracking device to which it is coupled. The information transmitted will typically include a manufacturing unique ID for the tractor as well as an optional user defined ID. The user defined ID may include a fleet division code, for example, which can identify the fleet, or a subset of a fleet, to which the particular tractor belongs.

Upon connection of a trailer equipped with a trailer tracking device to any tractor equipped with the transponder, the trailer tracking device will receive the associated tractor ID and/or fleet ID codes from the tractor. These codes, which uniquely identifier the tractor that now has possession of the trailer, can then be used to determine how the trailer is now hooked up. In particular, with detection of a connected state signal from the PLC bus, together with receipt of tractor identification code(s) from the tractor, the trailer tracking device can now communicate the coupling event together with the tractor ID and trailer ID information to the trailer management system located at a centralized location.

The occurrence of this sequence events provides three levels of information to the trailer management system:

the presence of communication from the tractor ID transponder indicates that the trailer is hooked to a tractor and is currently in use;

the tractor ID can be used to uniquely identify the tractor that is coupled to the reporting trailer;

when cargo loads are assigned to specific drivers and specific trailers, the trailer management system can then also determine if a correct pairing of tractor and trailer has occurred; and if a tractor is coupled to an incorrect trailer, an intervening action can occur before the trailer is moved.

In accordance with other aspects of the invention, an additional level of tractor/trailer management can be provided with the use of fleet codes. As explained above, fleet codes can be assigned to a subset of tractors. In one scenario, the trailer tracking device can then store one or more fleet codes that are authorized for assignment to that particular trailer. If the tractor that couples to a trailer reports a fleet code that is not authorized for assignment to that particular trailer, then the trailer tracking device can determine that an incorrect pairing has occurred, and communicate that fact to the centralized location. Again, an intervening action can be taken by the trailer management system.

In an alternative approach, the system can determine the incorrect pairing at the centralized location. This can be done by maintaining a list of allowable fleet codes at the centralized location, and by simply having the trailer tracking device report the fleet codes of both the tractor and trailer. The second approach makes management of tractor and trailer pairings to fleet codes easier, but requires that each coupling of a tractor to a trailer be reported to the centralized location.

In accordance with still further aspects of the invention, another level of fleet management can be provided if the fleet of trailers is configured to only permit assignment to identifiable tractors. In this configuration, if a coupling occurs and the tractor can not provide an identification to the trailer tracking device, an incorrect pairing can be reported to have occurred. The trailing tracking device can report this event as the trailer having been picked up by unauthorized tractor.

The trailer tracking device can also periodically query the tractor ID transponder for its identification code(s). Continued receipt of these codes by the trailer tracking device is evidence that coupling status has not changed, and that the trailer remains hooked to the previously identified tractor.

If, in this mode, a trailer tracking device does not receive a response after multiple successive queries to the tractor ID transponder apparatus, it can be determined that a connection between the tractor and trailer no longer exists, and the trailer has become unhooked. This information can then be communicated by the trailer tracking device to the centralized location as for example, an unhooked trailer event.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
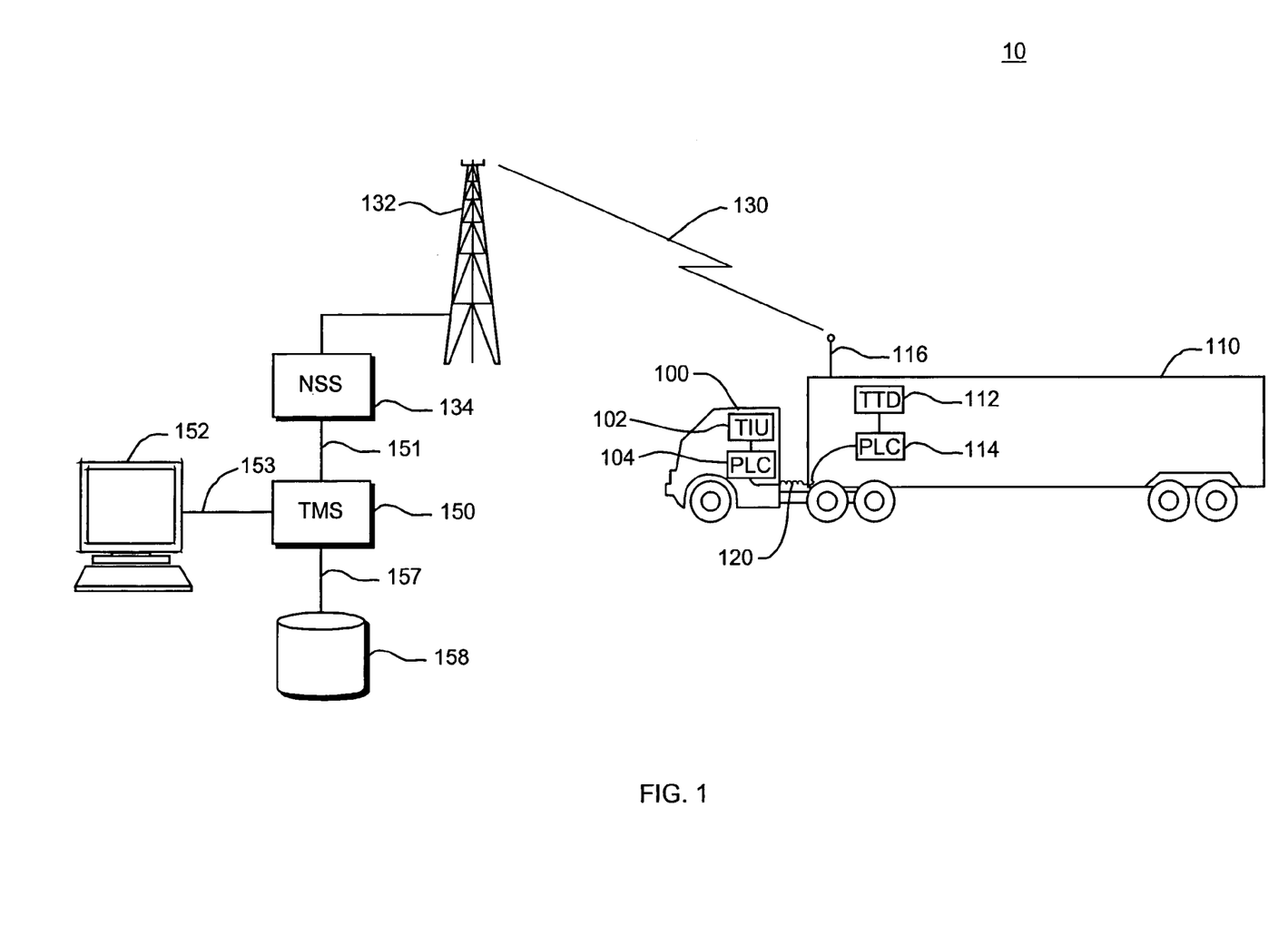
FIG. 1 is a high level system diagram showing a tractor, a cargo trailer, a wireless communication system and a trailer management system.

FIG. 1 is a high level diagram of the components of a system 10 that can be used to manage the connection between a truck tractor 100 and an associated cargo trailer 110. Briefly, the tractor 100 contains a small transponder device that communicates tractor identification (ID) data to a trailer tracking and communication device installed in the trailer 110. The trailer 110 in turn communicates this and other data over a wireless link 130 (such as may be provided by a cellular telephone network) to a Trailer Management System (TMS) 150. The system 10 permits the trailer tracking device 112 to report certain events to a central location such as when a trailer is hooked or unhooked from a tractor 100, which tractor 100 picked it up, and other notification such as when an unauthorized tractor hooks to a trailer.

More particularly, the tractor 100 has installed in it a transponder called a Tractor Identification Unit (TIU) 102. The TIU 102 stores and provides (either periodically or upon request) one or more data values indicative of identification information for the specific tractor 100. The identification information may include a tractor ID, a fleet ID, and other information. While the TIU 102 is shown as a stand alone electronic device (in this case a small transponder) it should be understood that the TIU 102 may also form part of a larger electronic system in the truck 100 such as a data processing system.

In the preferred embodiment, the TIU 102 provides identification information to a Trailer Tracking Device (TTD) 112 installed in trailer 110 via a connection 120. The connection 120 may be provided in a number of different ways. In a preferred embodiment the connection 120 is provided by a physical connection such as the Society of Automotive Engineers (SAE) standard J560 seven conductor cable. These cables are now used to couple the Anti-lock Braking System (ABS) of a tractor to a trailer according to the United States National Highway and Traffic Safety Administration (NHTSA). In the preferred embodiment, tractor ID information is carried over the J560 cable 120 using a Power Line Communication (PLC) interface. A PLC interface 104 is associated with a tractor 100, and a similar PLC interface 114 is associated with a trailer 110. The PLC interface uses known power line carrier based communication protocols, such as the PLC4TRUCKS protocol (based on the SAEJ1587 standard). These protocols specify media access control (MAC) layer formatting for messages. The TTD 112 is thus capable of receiving and transmitting messages from and to the tractor 110 over a PLC bus provided by the cable 120.

Also in a preferred embodiment, the PLC interfaces 104, 114 may make use of standard integrated circuits such as the P111PL Media Interface Integrated Circuit (IC) and SSCP485PL Transceiver IC as available from Intellon Corporation of Ocala, Fla. These transceivers use spread spectrum based communication techniques to enable data transmission over the J560 cable 120.

The TTD 112 also provides a trailer tracking device function. Thus, it typically includes a Global Positioning System (GPS) receiver capable of determining a location by triangulation of signals received from a satellite, as in accordance with techniques that are well known. In addition, the TTD 112 may receive inputs from sensors associated with the trailer 110 such as a wheel sensor, temperature, humidity, pressure, door open/close other sensors.

One of the primary purposes of the TTD 112 has thus been to periodic report a position for the trailer 110 to the TMS 150. This permits the user of the TMS 150 to track not only the single trailer 110, but also a fleet of trailers from a central location. This in turn allows for more effective management of a fleet of such trailers 110, assigning empty trailers as needed and as they become available, and the like.

The TTD 112 contains also a small data processing unit such as a microprocessor enabling it to carry out simple data processing tasks. Among those tasks are detection of tractor ID messages from the TIU 102, providing status reports such as location and other status information to the TMS 150 over the wireless link 130. In addition to forwarding tractor ID and paired trailer ID information to the TMS 150, the TTS has stored therein identification information associated with the particular trailer 110 in which it is installed. Thus, for example, the TTD has available to it data fields corresponding to a trailer ID.

In addition, the TTD 112 may communicate messages to a central location at which the TMS 150 is installed, via wireless link 130. Wireless link 130 may be provided by the standard cellular telephone infrastructure. In this case, the TTD 112 connects via a cellular telephone antenna 116 and base station antenna 130 to a wireless Network SubSystem (NSS) 134, which in turn acts as an interface for receiving and transmitting messages to and from the TTD 112. The NSS is in turn connected to the TMS 150 such as via suitable telecommunication network 151.

The TMS 150 is a data processing system that enables the user to maintain and manage information regarding trailers 110 and tractors 100. The TMS 150 typically consists of a user interface device such as a personal computer 152 that may be connected to the TMS 150 via a network connection 153. The TMS 150 may include database server 158 which may be a networked server that is also connected via another network connection 157.

It should be understood that modifications can be made to the various data processing systems shown in FIG. 1. For example, while the network connections 151, 153, and 157 may be connections made through telecommunications network such as the Internet and/or virtual private networks or other telephony networks that other connections can be made either directly or through Local Area Network, Wide Area Networks, or the like. Similarly, the wireless link 130 may be provided by other types of wireless networks such as satellite networks, paging networks, cellular packet data networks, or other wireless networks that provide relatively wide area coverage.

Figure 2A:
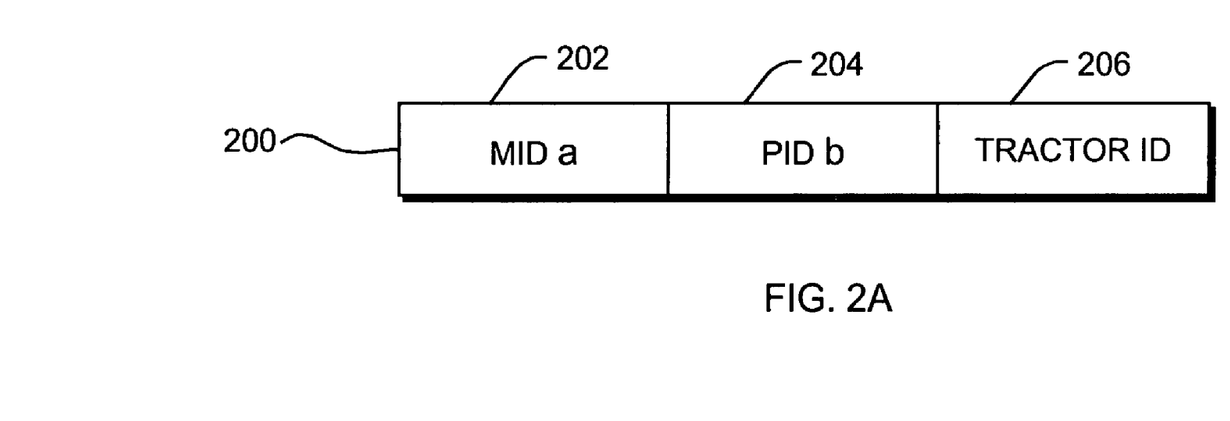
FIGS. 2A and 2B show typical message formats used on the power line communication bus.

The tractor ID information is transferred using a certain message 200 as defined by the PLC4TRUCKS protocol. FIG. 2A is a diagram of a format of one such tractor ID message 200 that originates from the TIU 102. The tractor ID message 200 contains a number of fields including a message ID (MID) field 202, a parameter ID (PID) field 204, and a tractor ID field 206. The MID 202 is coded to identify the type and/or sender of the message 200.

The PID field 204 is encoded with a special value that indicates that the message contains a tractor ID. In a preferred embodiment, one of the available PLC4TRUCKS MIDs in the range of the so called unassigned MIDs (MID numbers 112-127) could be assigned. There are also a number of PIDs that can be used to indicate a tractor ID message. Available PIDs include PID 243, indicating a free form text message, is one such value.

Figure 2B:
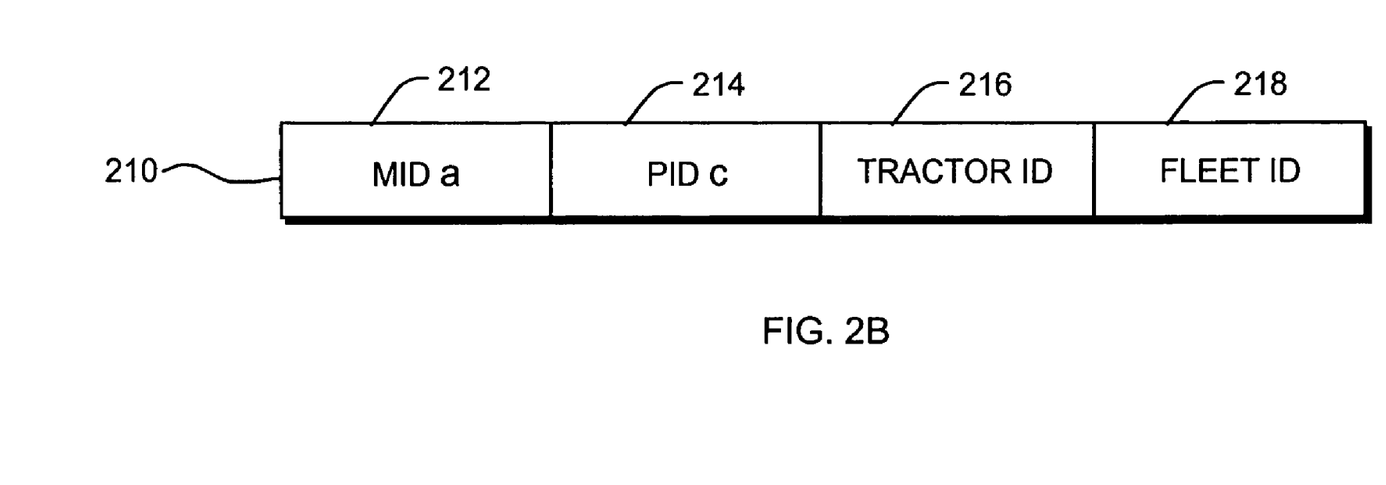

In accordance with an alternate embodiment a second type of message 210 may originate from the TIU 102. The second message 210 has a format similar to that of the first message 200 as it has a MID 212, PID 214, and tractor ID field 216. However, this message 210 also includes a fleet ID 218. As will be understood shortly the fleet ID field 218 provides an additional level of tractor/trailer management. For example, a fleet ID 218 can be assigned to a subset of tractors that are collectively represented by the particular fleet ID 218.

The TIU 102 may periodically transmit messages 200 or 210 or may also provide this information upon receipt of a request message from the TTD 112.

Figure 3:
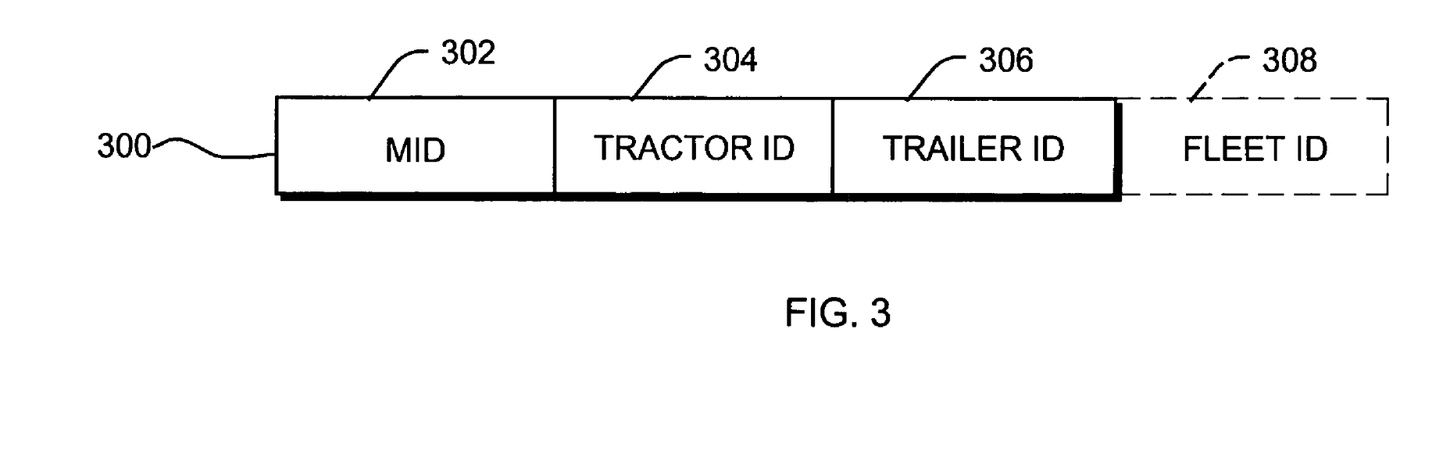
FIG. 3 shows typical message formats used on the wireless link.

FIG. 3 is a format of a message that may travel over the wireless link 130 from the TTD 112 to the TMS 150. Such a message 300 may include a message ID field 302 indicating the type of message. Other fields associated with this message also include a tractor ID 304 identifying the tractor associated with a message, a trailer ID 306 field and an optional fleet ID field 308. This message is then processed by the TMS 150 to determine if an appropriate pairing of tractor and trailer have occurred.

Figure 4:
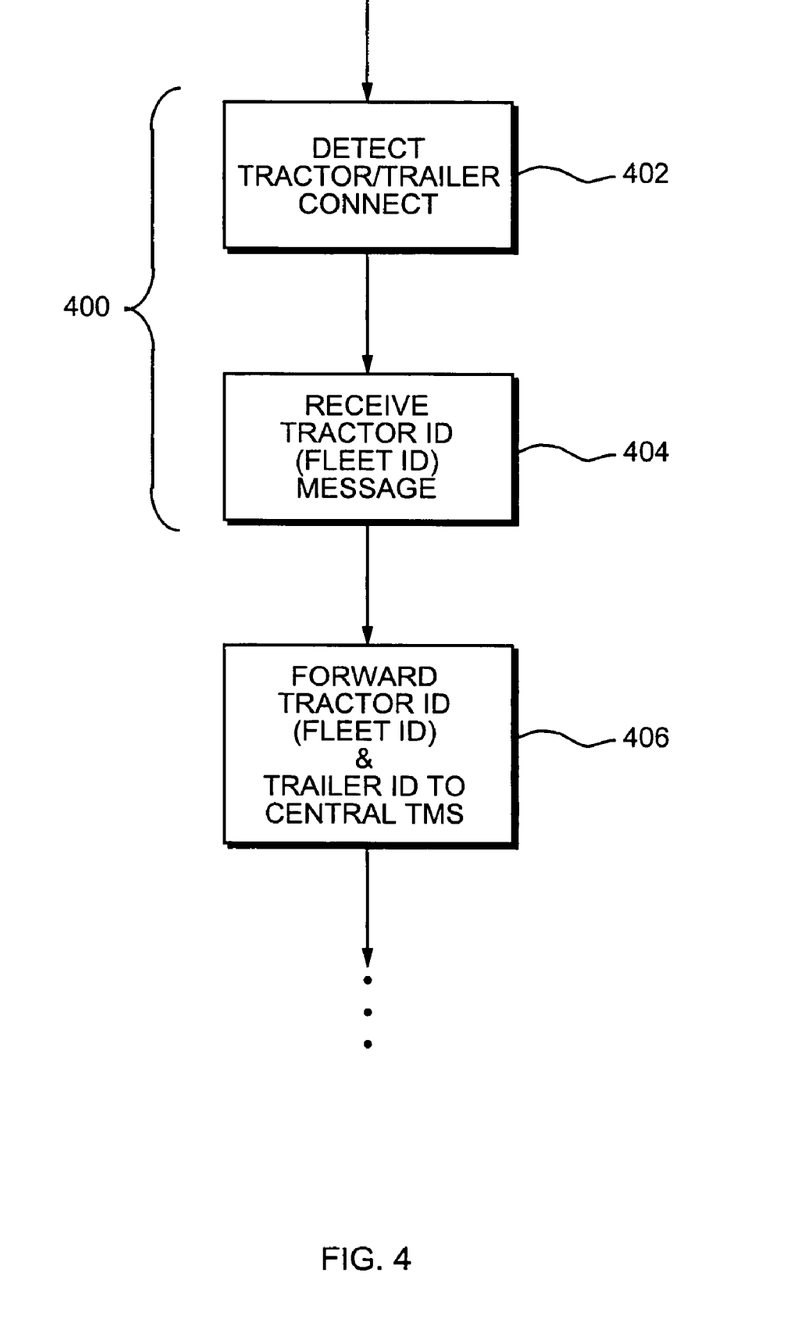
FIG. 4 is a flow chart of operations performed by a trailer tracking device installed on a trailer.

Turning attention to FIG. 4, there is shown a sequence of steps that can be carried out by the TTD 112 to make such a determination. In a first step 402 (which is an optional step), a tractor/trailer connect event can be detected. Such an event may be provided by an indication received from the PLC interface 114, a physical connection of the PLC 114 in the trailer is made to a corresponding PLC 104 in the tractor 100. Such an indication may be given, for example, upon detection that current is flowing on the PLC bus 120.

In a next step 404 a tractor ID message 200 or 210 is received.

In step 406, the TTD next combines the received tractor ID information and its own trailer ID information to create a message 300 as shown in FIG. 3. The message 300 is then communicated to the TMS 150 at the central location.

The occurrence of this sequence of events (including at least steps 404 and 406 in FIG. 4) provides three pieces of information to the TMS 150. In particular, the TMS 150 is now aware that:

(1) the trailer 110 is hooked to a tractor 100 and is currently in use;

(2) an identifier associated with the tractor (i.e., tractor ID field 206) now uniquely identifies the tractor that is coupled to the uniquely identified trailer (i.e., trailer ID field 306); and (3) if a correct pairing of tractor and trailer has occurred, such as by performing a database 158 lookup of cargo loads assigned to specific drivers and specific trailers.

It should also be understood that the type of message shown in FIG. 2B which includes a fleet ID may also be communicated by the steps 404 and 406. This can permit an additional level of tractor/trailer management. Thus for example, the TTD 112 can be configured by the user to contain a list of fleet codes that are authorized for assignment to a particular trailer. Incorrect pairing of mismatched fleet codes can be then detected at the centralized location via a database 158 lookup.

If a tractor has coupled to an incorrect trailer, an intervening action can be taken before the trailer is moved. For example, the unauthorized connection can be reported to the driver or the manager of a yard in which the trailer 110 is located. In more sophisticated systems, it may be possible via remote control commands received via the TTD 112 to lock the wheels of the trailer 110, preventing its movement until further authorization has been obtained.

Yet another level of tractor/trailer management can be provided if the fleet of trailers is configured to only permit assignment to identifiable tractors. For example, in the sequence of events shown in FIG. 5, the TTD 112 receives at some point in time one or more authorized fleet codes. The fleet codes indicate the group of trailers 110 to which the particular belongs. These may be all of the trailers owned by a particular service provider or a subset thereof. At a later time, such as at state 504, a tractor ID message is then received including both tractor ID and fleet code fields. In state 506, the fleet code received in a message is matched against the previously received authorized fleet codes. If the fleet codes do not match, then in state 508 the tractor ID and trailer ID field mismatch is reported as an event to the TMS 150. This is provided by sending an appropriate message in a predetermined format over the wireless link 130. At a next step 510 (which occurs at the TMS 150, after receiving such a message) the TMS 150 takes remedial action such as preventing further use of the trailer via locking its wheels or doors until further authorization is obtained.

Figure 5:
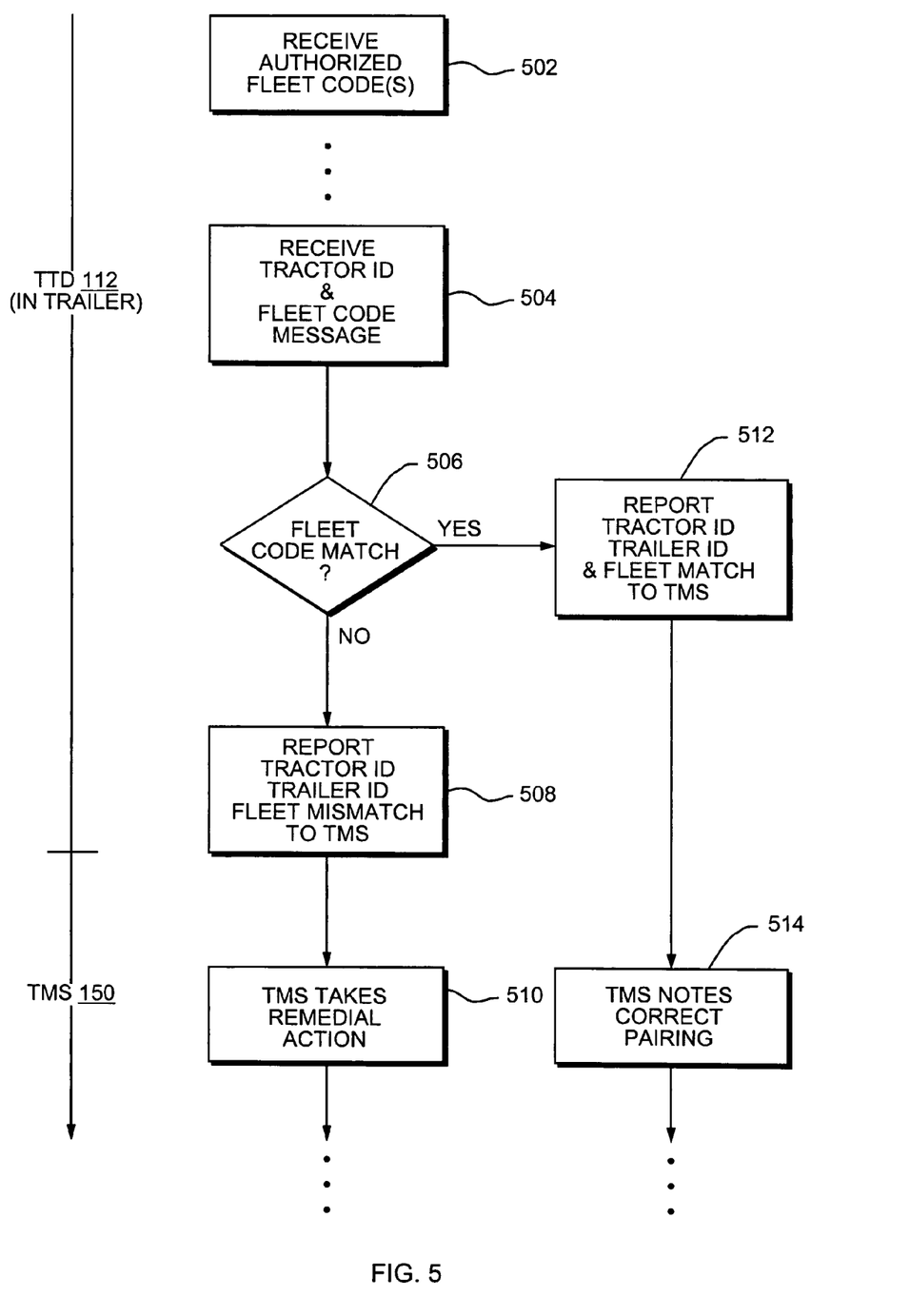
FIG. 5 is a flow chart showing an alternate sequence of instructions that provide fleet code matching.

If, however, in state 512 the TDD 112 determined that there was a fleet code match, then the fleet code match event is reported to the TMS 150. In this sequences of events, at state 514, the TMS 150 notes the correct pairing of tractor and trailer in the database 158, and then continues with normal status monitoring.

Figure 6:
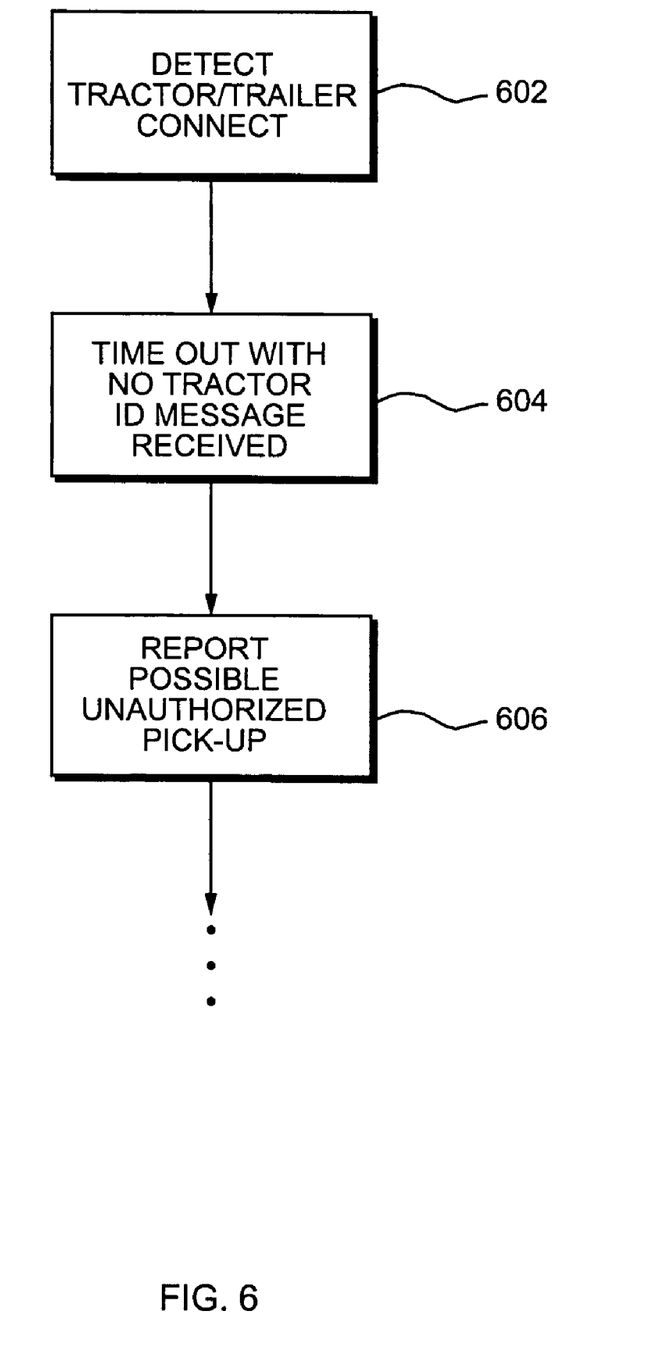
FIG. 6 is a still further flow chart of operations that occur when no valid tractor ID is received by the trailer tracking device.

FIG. 6 shows another sequence of events that may occur at the TTD 112. Here, in state 602, a tractor/trailer connect event is detected, similar to the previously described state 402. However, in state 604 a time out event occurs. In particular, a predetermined time expires during which no tractor ID message in the form of message 200 or 210 is received. At this point, in state 606, a possible unauthorized pickup is reported. This can be associated with detecting trailer movement so that idle trailers are not reported inappropriately. Thus, for example, if there is a tractor/trailer connect event and then time out in state 604, followed by detected movement of the trailer, (such as determined by GPS data) then a possible unauthorized pickup event 606 can be reported to the TMS 150.

Also in connection with FIG. 6, if a coupling between tractor and trailer occurs and the tractor cannot provide an identification to the satisfaction of the trailer tracking device, then an incorrect pairing can be determined to have occurred. The trailer tracking device 112 then reports the trailer to have been picked up by an unauthorized tractor or perhaps even having been stolen at this point.

Figure 7:
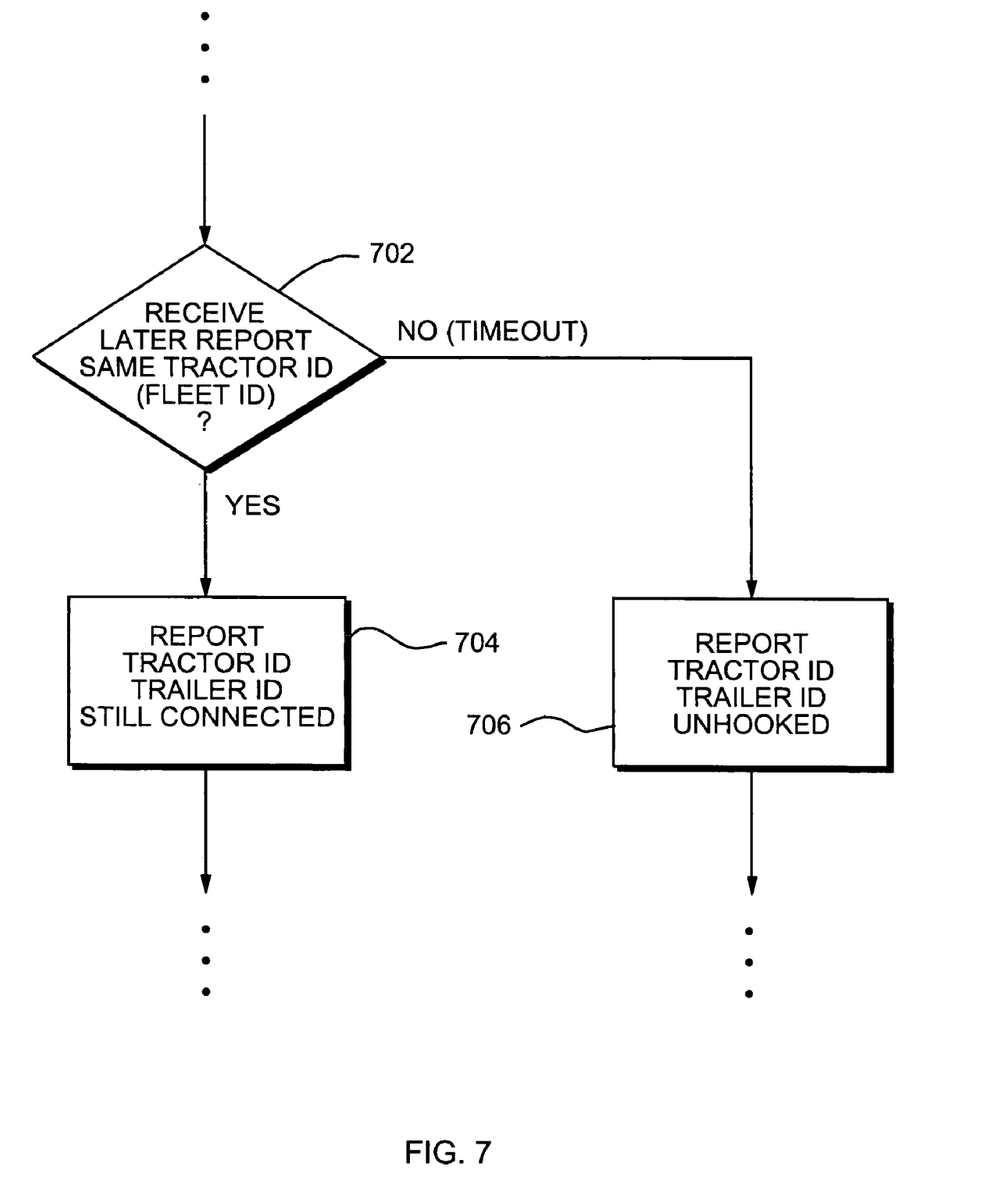
FIG. 7 is a flow chart of operations that may be performed to determine if a tractor and trailer remain connected.

FIG. 7 is another sequence of events that may occur using time outs. This sequence of events determines whether a tractor/trailer is still connected. In particular, in a state 702 (which may follow at some time after state 406 of FIG. 4 or state 512 of FIG. 5) a later report message 200, 210 is received indicating the same tractor ID and/or fleet ID as was previously seen. If this message is received in state 704, then a report can be made that the same tractor ID and trailer ID are still connected. If, however, later reports of coupled tractor ID and fleet ID are not received after a particular time out period, a state 706 is entered in which an unhook event for the particular tractor ID and trailer ID can be reported.

Further in connection with FIG. 7, the periodic querying of the tractor ID transponder 102 for its identification codes followed by continued proper receipt of these codes by the TTD 112 is evidence that the coupling status has not changed and that the trailer 110 remains coupled to an authorized tractor 100. If however, as shown in FIG. 7, the TTD 112 does not receive a response after multiple successive queries to the TIU 102 it can be determined that the connection between the tractor/trailer no longer exists and that the trail 110 has been unhooked.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for determining the connection of a cargo trailer to a tractor comprising:
   a tractor identification unit for providing a tractor identification information comprising a fleet code;
   a power line communication bus for receiving the tractor identification information and communicatively coupled to the tractor identification unit;
   a trailer tracking device, coupled to receive data from the power line communication bus and to receive the tractor identification information from the tractor identification unit, for combining the tractor identification information with its own trailer identification information to provide a tractor/trailer pairing data;
   a wide area wireless data link for permitting the trailer tracking device to communicate the tractor/trailer pairing data to a central location; and
   a receiver for receiving the tractor/trailer pairing data at the central location.

2. An apparatus as in claim 1 wherein the tractor identification information includes a user defined identification field.

3. An apparatus as in claim 2 wherein the user defined identification field is the fleet code.

4. An apparatus as in claim 1 wherein the central location additionally comprises a data processing system configured to determine correctness of a pairing of the tractor and the trailer using the tractor/trailer pairing data.

5. An apparatus as in claim 4 wherein if the pairing of the tractor and the trailer is determined to be incorrect, then an intervening action is taken before the trailer is moved.

6. An apparatus as in claim 3 wherein the fleet code is examined to determine if an unauthorized tractor has been hooked to the trailer.

7. An apparatus as in claim 1 wherein an uncoupling event is determined to have occurred if the tractor does not report the tractor identification information to the trailer tracking device.

8. An apparatus as in claim 1 wherein the tractor identification unit periodically provides the tractor identification information over the power line communication bus to the trailer tracking device, and the trailer tracking device determines that a coupling status has not changed as long as codes associated with the tractor identification unit are received.

9. An apparatus as in claim 8 additionally wherein upon multiple successive failures to receive tractor identification information, the trailer tracking device is configured to determine that a coupling between the tractor and the trailer no longer exists.

10. An apparatus as in claim 4 wherein the determination of correctness is made at the central location by comparing the tractor identification information and the trailer identification information against a list of allowed combinations.

11. An apparatus as in claim 1 wherein a determination of an incorrect pairing of the tractor and the trailer is made at the trailer tracking device by comparing a fleet code received from the tractor against a known authorized fleet code specified for the trailer.

12. An apparatus as in claim 1 wherein the wide area wireless data link comprises a wireless link on a cellular telecommunication network.

13. An apparatus as in claim 1 wherein the wide area wireless data link comprises a wireless link on a satellite network.

14. An apparatus as in claim 1 wherein the tractor/trailer pairing data comprises the fleet code.

* * * * *